United States Patent [19]

Maendel

[11] Patent Number: 4,888,468
[45] Date of Patent: Dec. 19, 1989

[54] BROODER LAMP

[75] Inventor: Benjamin Maendel, McGregor, Canada

[73] Assignee: Baker Colony Farms Ltd., McGregor, Canada

[21] Appl. No.: 218,850

[22] Filed: Jul. 14, 1988

[51] Int. Cl.⁴ .................. H05B 1/00; A01K 31/20; F21V 15/00
[52] U.S. Cl. .................................. 219/347; 119/32; 362/377
[58] Field of Search ............... 219/347, 342, 348, 349, 219/355, 357; 119/30, 31, 32, 33, 34, 37; 362/376, 377, 390, 370, 382, 432, 457

[56] References Cited

U.S. PATENT DOCUMENTS

| | | | |
|---|---|---|---|
| 1,579,155 | 3/1926 | Sheer | 119/32 |
| 1,850,347 | 3/1932 | Gorsuch | 119/32 |
| 2,219,882 | 10/1940 | Adams | 119/33 |
| 2,603,738 | 7/1952 | Schubert et al. | 126/92 |
| 2,604,875 | 7/1952 | Klay | 119/32 |
| 3,139,881 | 7/1964 | Fannon, Jr. | 126/92 |
| 4,197,444 | 4/1980 | Jones | 219/365 |

FOREIGN PATENT DOCUMENTS 471250 2/1951 Canada ................ 362/376

Primary Examiner—A. D. Pellinen
Assistant Examiner—Geoffrey S. Evans
Attorney, Agent, or Firm—Adrian D. Battison; Stanley G. Ade; Murray E. Thrift

[57] ABSTRACT

A brooder lamp for small animals, especially pigs, has a stainless steel reflector housing a bulb socket and a resilient metal plate extending across the reflector, in front of the socket. An opening in the plate is sized to pass the narrow neck of the bulb but to engage the widening port and to bias it away from the socket. This provides a secure mounting for the bulb in the socket to inhibit damage due to impact with the lamp of playful animals.

4 Claims, 1 Drawing Sheet

BROODER LAMP

FIELD OF THE INVENTION

This invention relates to a brooder lamp for use with young animals, for example chickens or pigs, to ensure that the animals are kept at the required elevated temperatures.

BACKGROUND OF THE INVENTION

Brooder lamps are usually suspended above a pen or the like to keep young animals at required elevated temperatures. Generally such brooder lamps comprise a spun aluminum reflector bowl which surrounds and protects a heat bulb. In addition, a metal grid extends across the open end of the bowl to prevent any damaged bulb from falling onto the animals below and to reduce the access by the animals to the bulb.

However one problem arises in devices of this type in that particularly with pigs they spend a significant part of their day attempting to play with the brooder lamps and can cause damage to the lamp. The life of the expensive bulb is significantly reduced in that the glass envelope of the bulb often works loose from the metal base thus breaking the bulb and terminating its life.

SUMMARY OF THE INVENTION

The present invention is concerned with improvements in a lamp of this general type.

According to the present invention there is provided a brooder lamp comprising a reflector housing and a bulb socket secured to the housing for receiving a heat lamp bulb base, a resilient metal plate secured to the housing and extending across the socket, the plate having an opening therein aligned with the socket, the opening being so sized and the metal plate being so positioned that with the base of the bulb inserted through the opening and engaged with the socket, the metal plate is engaged with the bulb and is resiliently deflected towards the socket.

The metal sheet presses against the widening part of the bulb to hold it away from the socket and to reduce the possibility of side to side movement relative to the socket and the bulb's base.

Preferably the housing is of a rectangular shape and is formed from stainless steel rather than aluminum to increase the reflection of the surfaces. This increased reflection tends to reduce the temperature of the metal surfaces and thus reduce the danger of overheating of the bulb which again can lead to shortened life.

DETAILED DESCRIPTION

Figure 1:
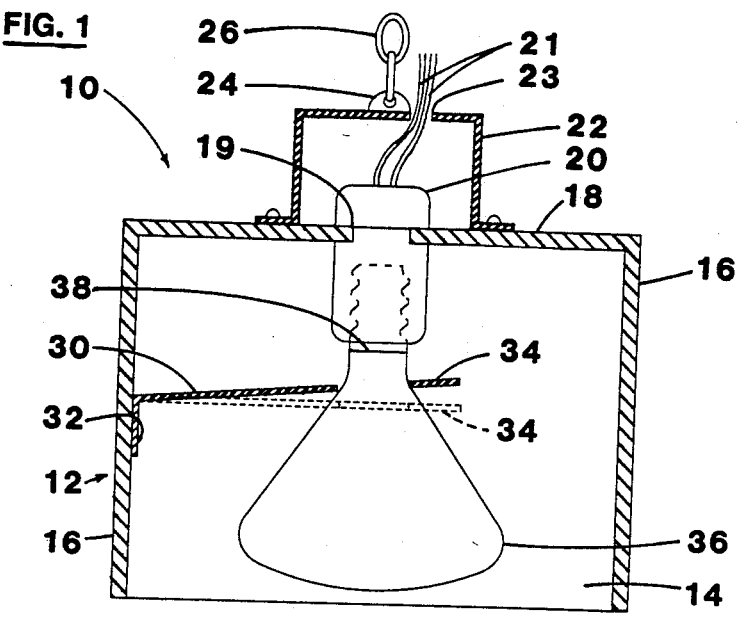
FIG. 1 is a sectional elevational of a lamp according to the present invention.
Figure 2:
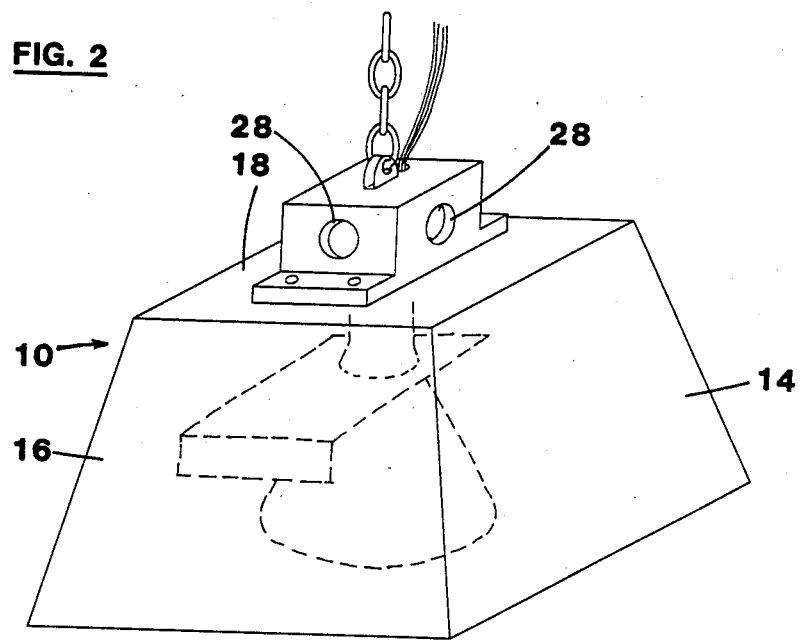
FIG. 2 is an isometric view of the lamp of FIG. 1.

Referring to the drawings there is illustrated a brooder lamp 10 consisting of a reflector housing 12 of polished stainless steel. The housing is generally rectangular in form with longer sides 14 that converge from the open bottom to the top of the housing and two trapezoidal ends 16. The top 18 of the reflector housing has an opening 19 therein to receive a ceramic bulb socket 20. The socket 20 is of conventional form and is secured to the top of the reflector housing in the conventional way. The end of the socket projecting above the housing is enclosed in a socket housing 22 which is itself secured to the top 18 of the reflector housing. A lug 24 projects from the top of the socket housing 22 and is secured to a chain 26 which serves to suspend the lamp 10. The electrical leads 21 from the ceramic socket 20 pass through an opening 23 in the socket housing 22 and extend along the suspension chain 26. Four vent holes 28 are formed in the sides of the socket housing 22 to eliminate any excessive heat buildup within the socket housing.

A resilient metal plate 30 is located within the reflector housing 12. A flange 32 along one edge of the plate is secured to one end 16 of the housing, while the main body of the plate projects into the housing, across the socket 20. The plate has an opening 34 formed in it, in alignment with the socket 20 so that in mounting a bulb 36 to the socket 20, the bulb base 38 is inserted through the opening 34 and then screwed into the socket 20. The opening 34 is so sized that it will accept the narrow neck of the glass envelope of the bulb 36 but will not pass the widening end. The plate 30 is so located relative to the socket 20 that when the bulb is inserted through the opening 34 in the plate and its base 38 screwed into the ceramic socket 20, the plate engages the widening part of the bulb and deflects resiliently from the broken line position illustrated in FIG. 1 to the solid line position shown in that figure. The result is that there is a resilient bias on the bulb in a downward direction, centering the bulb in the opening 34 to inhibit side to side movement of the bulb, which tends to break the glass envelope of the bulb from its base 38. The biasing force also provides a greater frictional engagement between the bulb base and the socket in addition to the frictional engagement of the bulb envelope with the plate 30. This inhibits loosening of the bulb base 38 in its socket 20 due to vibration.

The illustrated lamp is completed by a wire grid (not shown) mounted on the bottom end to prevent the animals under the lamp from coming into direct contact with the bulb.

While one embodiment of the present invention has been described in the foregoing, it is to be understood that other embodiments are possible within the scope of the present invention. It is intended that the scope of the present invention be ascertained solely by reference to the appended claims.

I claim:

1. In a brooder lamp comprising a reflector housing and a bulb socket secured to the housing for receiving a heat lamp bulb base, a resilient metal plate secured to the housing and extending across the socket, the plate having an opening therein aligned with the socket, the opening being so sized and the metal plate being so positioned that with the base of the bulb inserted through the opening and engaged with the socket, the metal plate is engaged with the bulb and is resiliently deflected towards the socket.

2. The brooder lamp according to claim 1 wherein the reflector housing is rectangular.

3. A brooder lamp according to claim 2 wherein the metal plate is secured to one side of the housing and extends therefrom across the socket.

4. A brooder lamp according to claim 1 wherein the reflector housing is polished steel.

* * * * *